J. KLUCINA.
ASH PAN.
APPLICATION FILED FEB. 19, 1917. RENEWED MAY 20, 1919.
1,308,245.
Patented July 1, 1919.
2 SHEETS—SHEET 1.
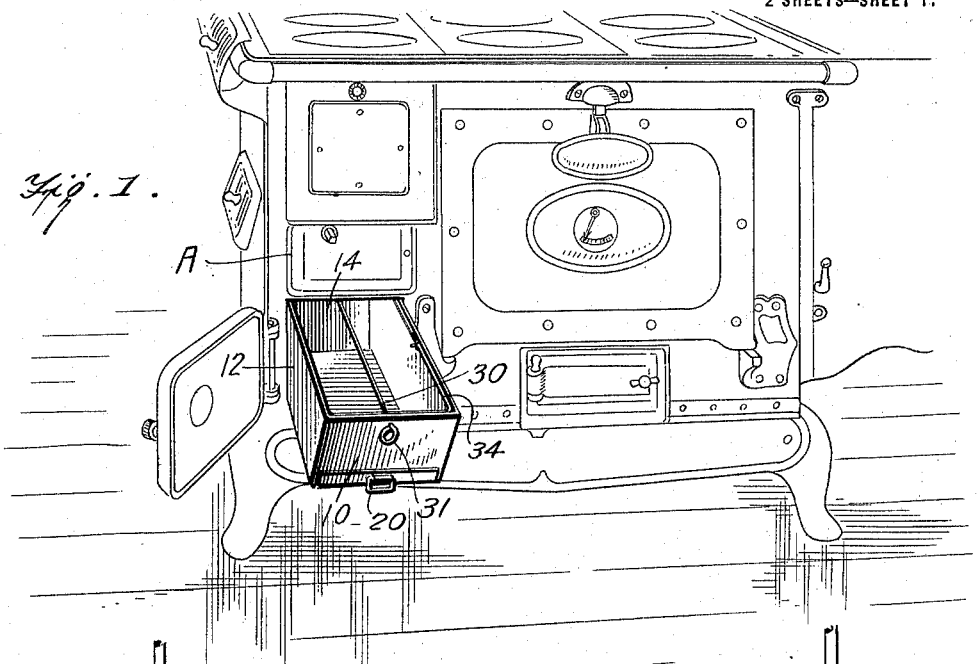
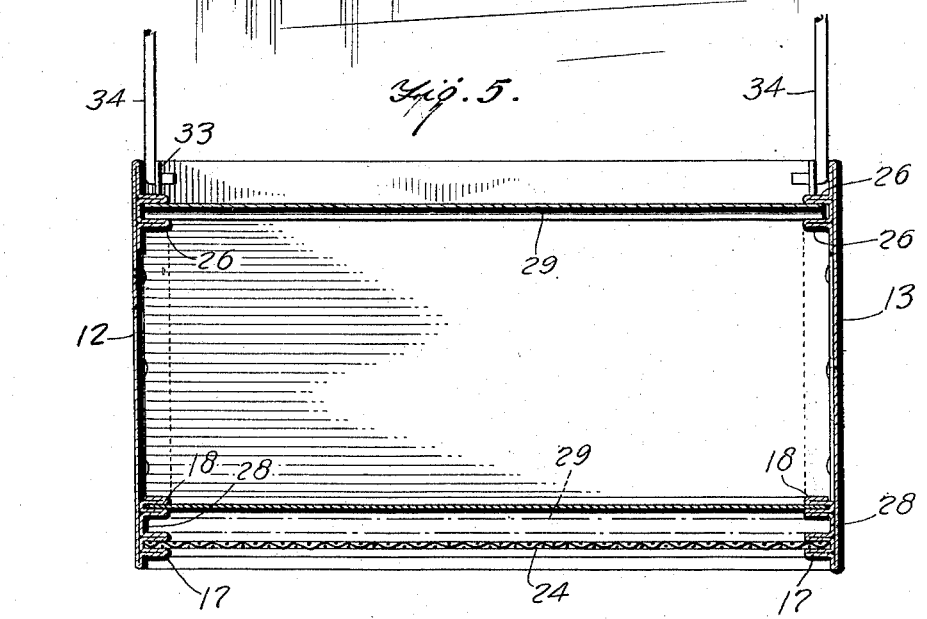
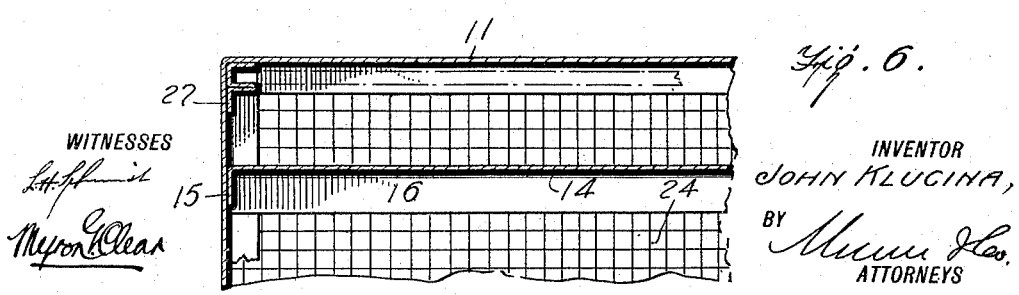
INVENTOR
JOHN KLUCINA,
BY
ATTORNEYS

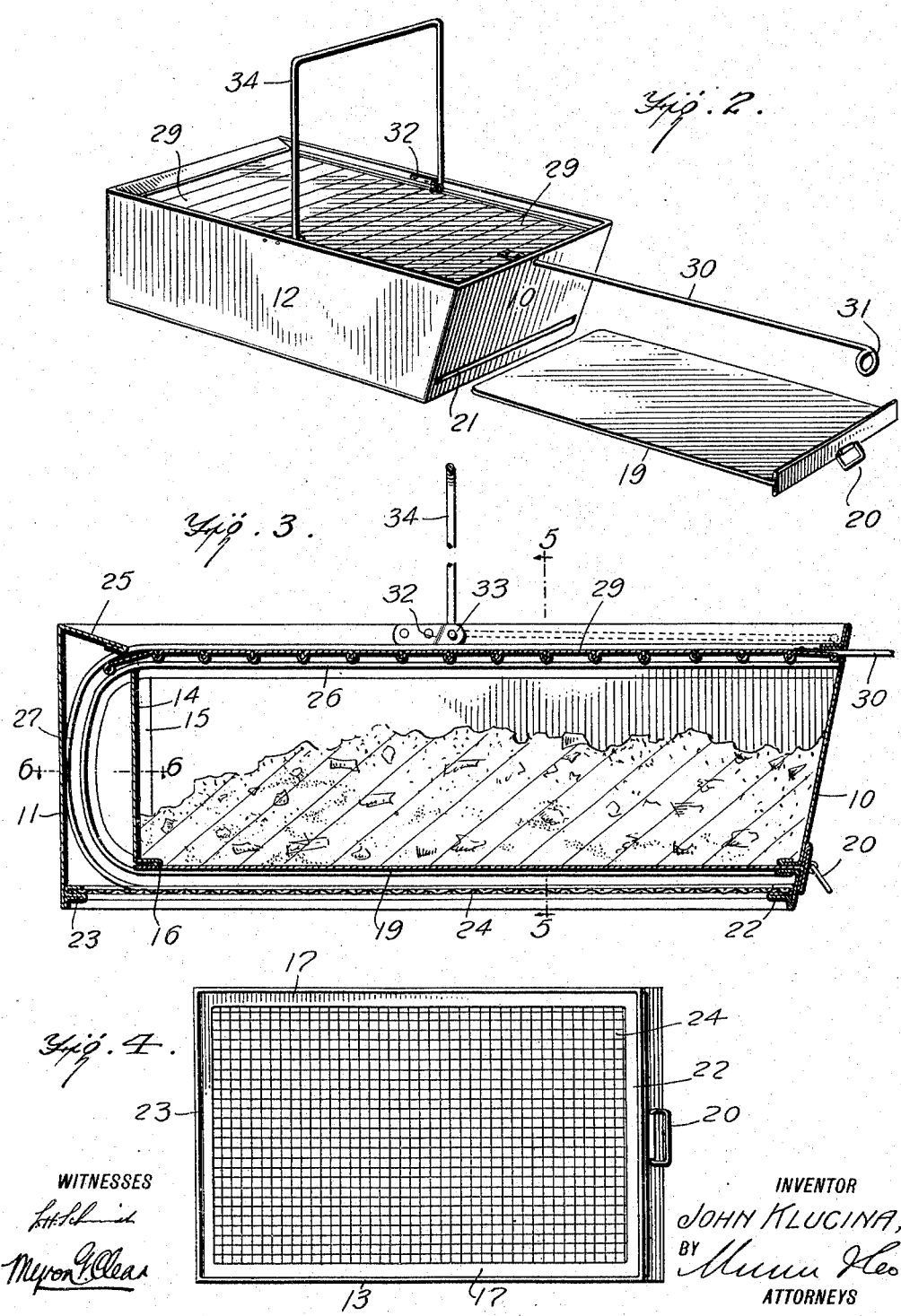

UNITED STATES PATENT OFFICE.

JOHN KLUCINA, OF CICERO, ILLINOIS.

ASH-PAN.

1,308,245.  Specification of Letters Patent.  Patented July 1, 1919.

Application filed February 19, 1917, Serial No. 149,468. Renewed May 20, 1919. Serial No. 298,553.

*To all whom it may concern:*

Be it known that I, JOHN KLUCINA, a citizen of the United States, and a resident of Cicero, in the county of Cook and State of Illinois, have invented a certain new and useful Improvement in Ash-Pans, of which the following is a specification.

My present invention relates generally to ash pans, and more particularly to ash pans for disposition within the ashpits of cook and other stoves, my object being to provide an ash-pan which may be readily handled, and by means of which the ashes may be disposed of in a sanitary convenient manner.

A further object of my invention is to provide an ash-pan whereby to save any good coals within the ashes.

Other objects relating for the most part to the details of construction of my improved device will be apparent from the following description, reference being made to the accompanying drawing wherein—

Figure 1 is a perspective view of a cook stove illustrating the practical application of my invention;

Fig. 2 is a detail perspective view of my improved ash pan with the bottom of its ash compartment removed;

Fig. 3 is a vertical longitudinal section through my improved ash-pan;

Fig. 4 is a bottom plan view thereof;

Fig. 5 is a vertical cross section taken substantially on line 5—5 of Fig. 3, and Fig. 6 is a partial horizontal section taken substantially on line 6—6 of Fig. 3.

Referring now to these figures, my invention provides a generally rectangular ash-pan for disposition within the ash-pit of a stove and the like, generally indicated, for instance, at A in Fig. 1, the pan having front and rear walls 10 and 11 respectively, and side walls 12 and 13.

The front wall 10 and the side walls 12 and 13 of the pan, form respectively the front and side walls of the ash holding receptacle, the rear wall 14 of which receptacle is disposed in parallel spaced relation to the rear wall 11 of the pan, and has side flanges 15 secured against the inner surfaces of the sides 12 and 13 of the pan, the lower edge of the said wall 14 having a lower flanged edge 16 terminating a short distance above the lower edges of the walls of the pan.

The lower edges of the side walls 12 and 13 of the pan have extensions bent inwardly and upwardly against the inner surfaces of the side walls to form vertically spaced guides 17 and 18, the upper guides 18 of which are in a horizontal plane slightly below the flanged lower edge 16 of the rear inner wall 14, to receive an imperforate slide, having a forward outer handle 20, for extension inwardly through the lower horizontal slot 21 of the front wall 10 of the pan, and into the said guide, the rear end of the slide engaging beneath the flange 16 when the slide is in its inner position, as seen in Fig. 3, to form the bottom of the ash receiving receptacle.

The front and rear pan walls 10 and 11 have extensions at their inner edges bent inwardly to form guides 22 and 23, in horizontal alinement with the lower guides 17 of the side walls 12 and 13, these several alined guides providing for the reception and retention of a reticulated base 24 of the pan, by means of which the pan may be utilized as a sifter, by removing the sliding bottom 19 of the ash-receiving space, the latter of which is normally in position of course when the pan is disposed within the cook stove A.

The rear pan wall 11 has an inclined extension 25 at its upper end, as best seen in Figs. 2 and 3, bent inwardly and downwardly, and resting upon the rear portion of upper inner guides 26, with which the side walls 12 and 13 are provided at their upper ends, these latter guides 26 extending from the front wall 10, beneath the extension 25 of the rear wall 11, and curving downwardly as best seen at 27 in Fig. 3, within the space between the rear wall 11 of the pan and the inner rear wall 14 of the ash receiving receptacle, the lower ends of the curved portions 27 of the guides 26 extending to the rear end of the spaces 28 between the lower guides 17 and 18 of the side walls, forming a continuous guide for the side edges of an adjustable cover 29, the forward end of which is provided with a forwardly projecting rod 30 having a handle 31 at its forward end, and extending through an aperture in the upper portion of the front wall 10 of the pan as clearly seen in Figs. 2 and 3.

The cover 29 is formed of a plurality of flexibly jointed sections, as clearly seen in Figs. 2 and 3, by virtue of which it is slidable in the guides 26 and 27 as well as into the guide space 28, in order to cover and uncover the ash receiving space, controlled by its rod 30 and handle 31.

The pan is further provided at the upper edges of the side walls 12 and 13 at points intermediate the front and rear walls 10 and 11, with brackets 32 having offset lips 33, in which the angular extremities of a U-shaped bail or handle 34 are pivotally supported, this bail or handle being thus adjustable from its inoperative position horizontally upon the upper guides 26, as seen in Fig. 1, to an operative vertical position, as shown in Fig. 3, beyond which it cannot move in view of the offsetting of the ears 33 of the brackets 32.

It is obvious that, in the use of my improved ash-pan, the rod 30 is thrust inwardly to uncover the ash-receiving space or receptacle of the pan, and the sliding bottom 19 is placed in proper position before the pan is disposed within the ash pit of the stove, the bail 34 being at that time in its lower inoperative position.

When it is desired to remove the pan with the ashes therein, the rod 30 may be first drawn forwardly by means of its handle 31, in order to shift the flexible cover 29 to the operative position, shown in Fig. 3, covering the ash-receiving space, and the pan may be drawn forwardly by the same means until the operator can conveniently reach the bail 34, so as to lift the latter to its operative position as shown in Fig. 3, and remove the ashpan bodily from the ash-pit for transportation to the point at which the ashes are to be disposed of.

Should it then be desired to sift the ashes, the bottom slide 19 is withdrawn, as seen in Fig. 2, and, with the cover 29 closed, shaking motion of the ash-pan serves to shift the ashes through the reticulated base 24. Then, upon shifting movement of the cover 29 to inoperative position, the good coal left within the ash-receiving space may be dumped into the stove, and when the slide 19 is again placed in operative position as seen in Fig. 3, the pan is once more ready for disposal within the ash-pit of the stove.

It is obvious from the foregoing that my invention provides a convenient effective means of ash disposal, in which the bottom of the ash-receiving receptacle, the removable slide 19, may be renewed from time to time, and which will, for this and other structural reasons, be strong and durable in use.

I claim:

1. An ash-pan having front and side walls, and inner and outer spaced apart rear walls, of which the inner rear wall and said front and side walls form an ash-holding receptacle, said side walls having guides along their inner surfaces, and portions of which extend within the space between said rear walls, and a flexible closure adjustable in said guides to cover and uncover the ash-holding receptacle and forming a part of the pan in both positions.

2. An ash-pan having front and side walls, and inner and outer spaced apart rear walls, of which the inner rear wall and said front and side walls form an ash holding receptacle, said side walls having guides along their inner surfaces above and below the ash holding receptacle, and curved through the space between said inner and outer rear walls, and a jointed lid adjustable in said guides to cover and uncover the ash-holding receptacle.

3. An ash-pan having front and side walls, and inner and outer spaced apart rear walls, of which the inner rear wall and said front and side walls form an ash-holding receptacle, said side walls having guides along their inner surfaces, and portions of which extend within the space between said rear walls, a flexible closure adjustable in said guides to cover and uncover the ash-holding receptacle, and an adjusting rod connected to the forward portion of said closure and extending through the front wall.

4. An ash-pan having front and side walls, and inner and outer spaced apart rear walls, of which the inner rear wall and said front and side walls form an ash-holding receptacle, said side walls having guides along their inner surfaces, and portions of which extend within the space between said rear walls, a flexible closure adjustable in said guides to cover and uncover the ash-holding receptacle, said closure consisting of a plurality of flexibly jointed plates.

5. An ash pan having front, rear and side walls, of which the side walls have inturned upper and lower extensions bent back thereon and forming guides, reticulated and impervious base members in spaced superposed relation within the lower portion of said pan forming a receptacle beneath the upper guides and above the lower guides of the pan sides, and a flexible cover adjustable from one to the other of said guides to cover and uncover the pan, said impervious base member being removable whereby the reticulated base member may be utilized as a sifter when the cover is in closed position within the upper guides.

JOHN KLUCINA.

Copies of this patent may be obtained for five cents each, by addressing the "Commissioner of Patents, Washington, D. C."